JAMES C. EARTHMAN INVENTOR.

BY John D. Gassett
ATTORNEY

Sept. 28, 1965  J. C. EARTHMAN  3,209,320
SYSTEM FOR ANALYZING SEISMIC SIGNALS
Filed Oct. 30, 1961  3 Sheets-Sheet 2

JAMES C. EARTHMAN INVENTOR.

BY John D. Gassett
ATTORNEY

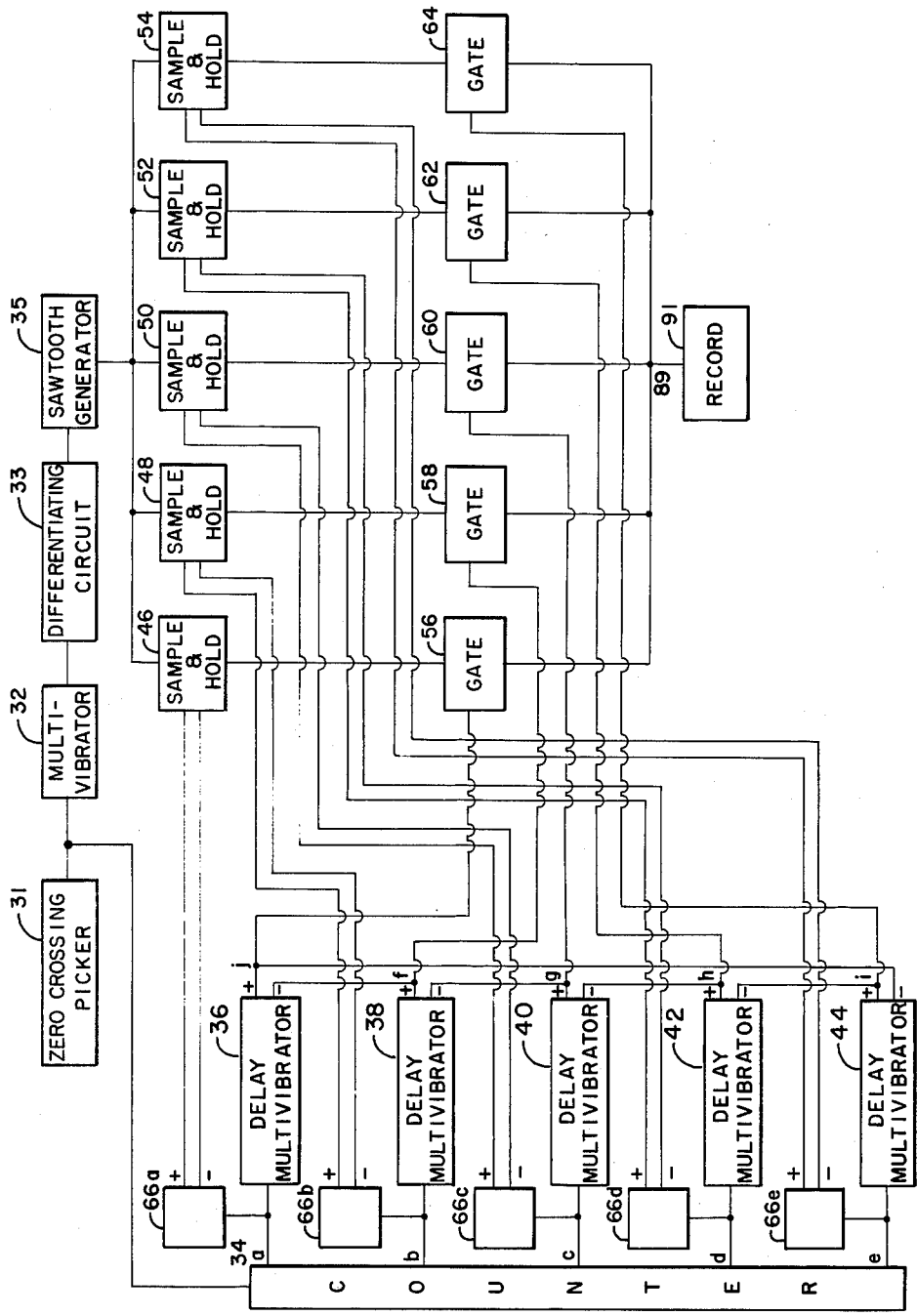

United States Patent Office 3,209,320
Patented Sept. 28, 1965

3,209,320
SYSTEM FOR ANALYZING SEISMIC SIGNALS
James C. Earthman, Tulsa, Okla., assignor, by mesne assignments, to Esso Production Research Company, Houston, Tex., a corporation of Delaware
Filed Oct. 30, 1961, Ser. No. 148,365
5 Claims. (Cl. 340—15.5)

The present invention concerns an improvement in the systems for analyzing seismic signals. It particularly relates to a system wherein an indication of the frequency of seismic signals is determined.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. Waves continue to travel downward within the earth, until they encounter discontinuities in the earth's structure in the form of various subsurface formations and the like. These discontinuities have the effect of reflecting a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to as a seismic signal which, in effect, is a composite signal made up of a plurality of electrical signals varying in frequency and amplitude. The electrical signals oscillate by a no signal zero voltage point or electrical base line.

A wide spread practice in the past has been to examine the amplitude characteristics of the recordings made of the seismic signals by correlating the amplitudes of the plurality of traces on a seismic record. The seismic observers then would by studying such traces determine the shape of reflected subsurface formation. By accurately recording the time required for the seismic wave to travel to the reflecting surfaces and return to the geophone, it is possible to determine the depth to such reflection surfaces. Presently, most seismic signals are recorded in reproducible form which normally takes the form of a magnetic recording device such as magnetic tape.

Most conventional seismographs, that is devices for recording the seismic signals, are capable of recording up to 24 or more separate seismic signals simultaneously. Thus, if a seismic observation results in 24 seismic signals being generated at as many detection stations, the resulting seismograph is a 24 trace record of the resulting 24 signals. The traces are normally arranged in a side-by-side relationship. A timing trace indicating predetermined time intervals is simultaneously recorded with the seismic signals to indicate the amount of time on each trace. Once the seismogram has been made, persons skilled in the art are generally able to determine from the data recorded on a seismogram certain characteristics of the earth's substrata in the vicinity of the seismic observation. The accuracy of exploration by seismic methods depends to a large extent upon the ability of the observer to analyze recorded seismic information. It has been found that variable density records of variable color records in which the signal is reproduced as a photographic trace which varies in intensity or in color along its length in proportion to the intensity of the signal are more easily analyzed than other types of records. However, this variable density or variable color method of recording seismic information does not readily reflect changes in the frequency of the recorded seismic signal. This shortcoming has developed into a disadvantage inasmuch as it has now been observed that changes in record frequency or the frequency of the seismic signal are related to subsurface conditions which may have a bearing on petroleum or other mining exploration.

It is known that seismic impulses undergo changes in frequency as they pass through various types of formations. Dense highly resilient formations produce relatively little frequency changes, while less dense formations may result in a considerable frequency change. Thus a change in frequency recorded on a seismogram may indicate a change in material from one type of subsurface earth formation to another; and when laterally obtained records are compared, subsurface structures may be determined.

A system in which the frequency changes of the seismic signals are recorded in variable color or variable density form is quite valuable. In such a system, for example, the zero crossings of the seismic signal are detected and the frequency of the occurrence of the zero crossings are displayed in a manner to present frequency variations in variable color form. The time between zero crossings is used to determine (1) the area to be exposed on a recording medium and (2) the color of the exposure.

In the interpretation of color frequency analysis sections it is sometimes difficult to determine by visual observation the predominate color over a particular interval. In the color frequency analysis system assume, for example, that it is desired that the frequency of interest is between 25 to 50 cycles per second. The human eye can detect only a certain amount of colors and a different shade of coloring cannot be applied to each frequency, therefore, each color that is detectable has to be assigned a range of frequencies in order to cover the desired total range of frequencies of interest in analyzing a seismic signal. In that example then different ranges of frequencies are given a different color; for example, 25 to 30 c.p.s.—red, 30 to 35 c.p.s.—green, 35 to 40 c.p.s.—yellow, 40 to 45 c.p.s.—blue and 45 to 50 c.p.s.—black. Of course, it is not always known that the selected color for the selected ranges are the best. To illustrate, in the example given assume that a real anomaly exists and results in the change of frequency from 31 to 34 cycles per second. This change would not show up very well on the color frequency analysis section which is being studied as each frequency would be represented by a shade of green. It is thus clear that there is a need for a system which will determine or help determine what frequency should be the dividing point between different colors. The present invention provides a system whereby the assignment of different colors to different frequency ranges within the range of interest can be more judiciously selected.

Briefly in a preferred embodiment, the present invention comprises a system for plotting in graphical presentation an indication of frequency content of time intervals of a seismic signal. The interval of the seismic signal which is to be analyzed is passed to a breadth detector means which has an output signal which is a series of voltage levels; the amplitude and duration of each level is a function of the time interval between two adjacent significant points of which the voltage level is representative. The output of the breadth detector means or the various voltage level signal is fed to a plurality of separating means each of which has been designed to be activated or pass therethrough voltage levels which are in an amplitude range assigned to that channel or separating means. Each separating means then has an output which is indicative of the frequency content assigned to it as indicated by the voltage level assignment. Means are provided to display the relative energization of the output of the various channels of the separating means so as to obtain a graphical presentation of the frequency content of the selected time interval of the seismic signal being processed.

At this point it is well to note that several terms in this description are assumed to have the following meanings. Thus the term "frequency" is meant to be the number of times or the rate of time, as indicated by the time interval, between the occurrence of significant events in a seismic signal such as the number of times a seismic signal crosses the zero signal axis per unit of time. The term "zero crossings" refers to the crossing of a zero signal axis by the signal wave form. The term "positive zero crossing" refers to the crossing of a zero signal axis by the signal wave form in which the wave form changes from a negative to a positive value, and the term "negative zero crossing" refers to the crossing of zero signal axis where the seismic signal changes from positive to a negative value. Other objects and a fuller understanding of this invention may be had by referring to the following description taken in conjunction with the accompanying drawing in which:

FIG. 3 illustrates in block diagram form a breadth detector as used in FIG. 1; and, FIG. 4 illustrates a suitable sample-and-hold circuit for use in the breadth detector illustrated in FIG. 3.

Figure 1:
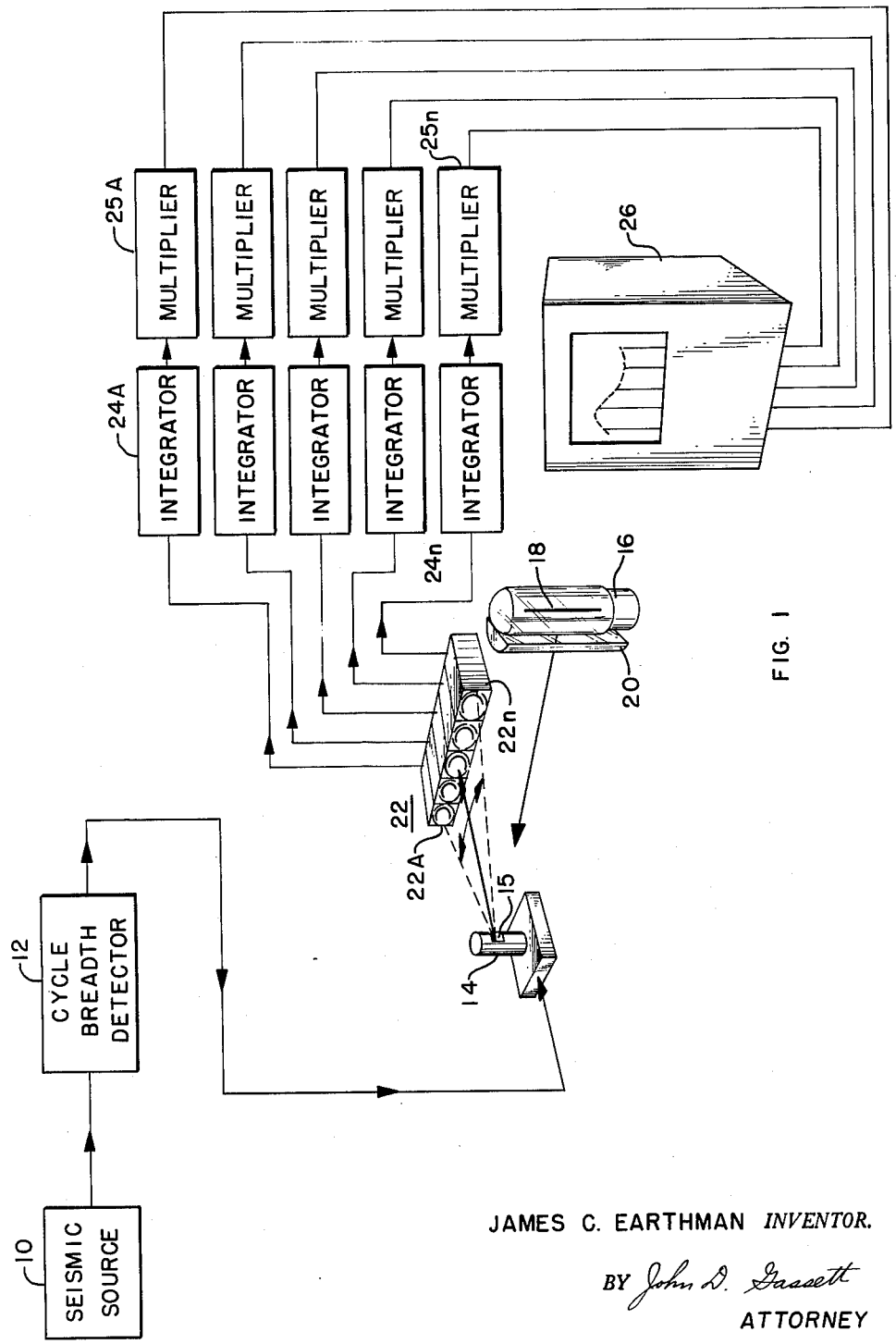
FIG. 1 illustrates in block diagram form a system which can be used in the practice of this invention.
Figure 2:
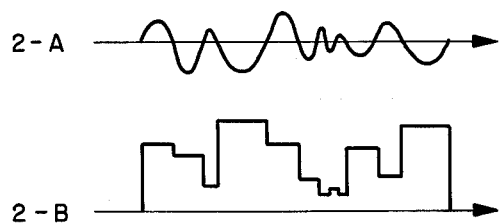
FIG. 2 illustrates an interval of a seismic signal and a signal representing the time between zero crossings.

Referring first to FIG. 1, numeral 10 represents a seismic signal or source with amplification. This source may include any reproducible recording of a seismic signal such as a magnetic recording medium or the seismic signal may be taken directly from a geophone and amplified. It is contemplated that reproduced signals produced from reproducible trace recordings will be used with this invention more frequently than signals taken directly from a geophone. The seismic signal is essentially sinusoidal as illustrated at curve 2–A in FIG. 2. The seismic signal from seismic signal source 10 is fed to a cycle breadth detector 12. A suitable cycle breadth detector is described in co-pending application Serial No. 831,248 now Patent 3,063,014 filed August 3, 1959 for John L. Shanks. A suitable cycle breadth detector will be described hereinafter more completely in relation to FIG. 3. However, in general it can be said that the cycle breadth detector has an output signal which is a series of voltage levels in which the amplitude of each level is proportional to the corresponding time between adjacent, selected, significant points in the seismic signal. For an example, in curve 2–B each voltage level has a duration of the corresponding time between zero crossings of its corresponding seismic sinusoidal wave 2–A. The amplitude of each level is also proportional to the time between the zero crossings which that voltage level is representative. The output from cycle breadth detector 12 is fed to a mirror galvanometer 14 in which the position of the mirror 15 is responsive to the signal fed thereto.

A light source 16 is provided which can be a lamp having a vertical line filament 18 through a cylindrical lens 20 to be reflected from the mirror 15 of mirror galvanometer 14 onto a row of photoelectric transducers 22. Any light source capable of emitting a sharp beam of light is suitable. Photo transducers row 22 is made up of a plurality of individual photoelectric cells 22A to 22n inclusive. Each photo cell is of a character to have one magnitude of output voltage when no light from light source 16 is reflected thereon and a second magnitude of signal when receiving reflection of light from light source 16. It is preferred that the first magnitude of voltage be approximately zero.

Each photo cell 22A to 22n has its output electrically connected to electronic integrator 24A to 24n respectively. The integrators are of a character to have an output voltage to integrate or "sum" the current or signal fed to it over a period of at least about two or three seconds. A suitable electronic integrator is described in FIGS. 18–19(b) of Waveforms by Chance, Hughes, MacNichol, Sayre, and Williams and published by McGraw-Hill. The output of each electronic integrator 24A to 24n is electrically connected to multi-channel display unit 26. A suitable display unit is commercially available from Advanced Technology Laboratories, A Division of American-Standard, 369 Whisman Road, Mountain View, California, and is designated ATL Model 220 Profile Monitor. The measurement channels i.e. the output of the electronic integrators 24A to 24n should be scanned with a sufficient frequency to provide a visual display that is essentially continuous.

The output of cycle breadth detector 12 is a series of voltage levels in which the amplitude and duration of each level is a function of frequency or time between zero crossings. Adjustment of the output of each integrator can be made to compensate for the difference in various cycle breadth times by compensating multiplying means or multipliers. To accomplish this, multiplying means 25A to 25n are connected respectively to the output of integrators 24A to 24n. Thus, by the use of multiplying means 25A to 25n, a more realistic comparison of frequency content will be possible.

For purpose of example in the operation of this device, it will be assumed that it is desired to obtain a plotting of the integrated cycle breadth content of time intervals of a seismic signal. That is, it is desired to determine the relative cycle breadth content of a signal. For example, assume that it is desired that the frequency of interest is between 25 to 50 cycles per second. Assume further for example that then it is desired to find the relative amplitude of each frequency component for each signal between 25 and 50 cycles per second, that is for 25, 26, 27, etc. In such a situation it is desired to have 26 photoelectric cells 22, which are arranged to receive light from mirror 15 such that when mirror 15 is in a rotation position of a voltage level representatice of 25 cycles per second then light will be reflected on one photo cell, for example 22A. When mirror 15 is rotated to a second position representative of a cycle breadth representing 26 cycles per second, light will be reflected onto the next succeeding photo cell. This arrangement is repeated sequentially until when the galvanometer is in a position representative of 50 cycles per second, then light from mirror 15 is reflected on mirror 22n which in this instant is the 26th photoelectric cell.

After the number of photo cells and its associated parts have been selected and arranged properly as described above, the seismic signal is reproduced and fed to cycle breadth detector 12. The output of cycle breadth detector 12 is fed to galvanometer 14. The output of cycle breadth detector 12 is seen to be a series of voltage levels, each having a duration and an amplitude indicative of the distance between zero crossings of the seismic signals. Galvanometer 14 follows the signal of the series of voltage levels and reflects light on the photo cells 22A to 22n. The output from each photo cell 22A to 22n is integrated by its associated electronic integrator 24A to 24n. If it is desired to know the relative amount of 25 cycles, etc. to 50 cycles displayed on the display unit 26, it is usually desirable to compensate for the difference in the various cycle breadth times. That is, a 25 cycle breadth time is twice as wide as a 50 cycle breadth time; therefore in order to get a direct comparison of an indication of the amplitude of each frequency component on the display unit, the output of electronic integrators 24A to 24n are modified by a factor representative of the difference in the various cycle breadth times. For example, the output of the integrator associated with 25 cycles per second is multiplied by a factor which is one-half the multiplying factor of the integrator associated with the 50 cycle breadth. The multiplying factors can be greater or less than unity if the proper ratio of multiplying factors is maintained. Therefore if during a particular interval, one cycle of 25 c.p.s. signal and one cycle of 50 c.p.s. signal occur, the graphical plot would show equal amplitudes at these frequencies. This is accomplished by a proper adjustment of multiplying means 25A to 25n. The display on multi-channel display unit 26 then is a graphical plotting of the cycle breadth content of the interval of the seismic signal under consideration. By graphically plotting the cycle breadth content of the interval, some of the human element in deciding the cycle breath content of that interval is thus removed. Further, using the system of this invention to plot the cycle breadth content of the time interval and proper selection of the steps of the horizontal scale, permit detection of small changes in overall frequency content of that time interval. Further, the graphical plot will help in some cases in determining the particular frequency color relationship needed to best show a frequency anomaly. For example, if the change in frequency from 31 to 34 cycles per second is shown up on the display 26 as being rather pronounced, then the colors which are assigned to a different frequency in the color presentation of the cycle breadth information should be selected so that there is a contrast in color for 31 cycles per second and the color representative of 34 cycles per second.

Referring now briefly to FIG. 3, there is illustrated in block diagram form a breadth detector suitable for use in the system illustrated in FIG. 1. The seismic signal from the seismic signal source such as 10 in FIG. 1 is fed to zero crossing picker 31. The zero crossing picker generates a sharp pulse of short duration for each zero crossing. Such zero crossing pickers are well known in the art, one such picker being described in Waveforms published by McGraw-Hill Book Company of New York, 1949, on pages 352-356. The output signal from zero crossing picker 31 is fed to a monostable multi-vibrator 32 and to a counter 34. One shot multi-vibrator 32 is triggered upon receiving the sharp pulses from zero crossing picker 31. The pulse of multi-vibrator 32 has a duration preferably of about 2 milliseconds for a frequency range of from about 10 cycles per second to about 100 cycles per second which is the normal range of interest in seismic prospecting. The positive output pulse from multi-vibrator 32 is fed to a differentiating circuit 33 which is described in Waveforms supra. The output of item 33 is fed to sawtooth generator 35. Sawtooth generator 35 is of a character to generate a constant linearly rising voltage upon being energized by a sharp positive pulse from differentiating circuit 33. Upon receiving an indication from zero crossing picker 31, delayed through multi-vibrator 32, sawtooth generator 35 is reset to zero voltage and again starts generating its linearly rising voltage.

Figure 4:
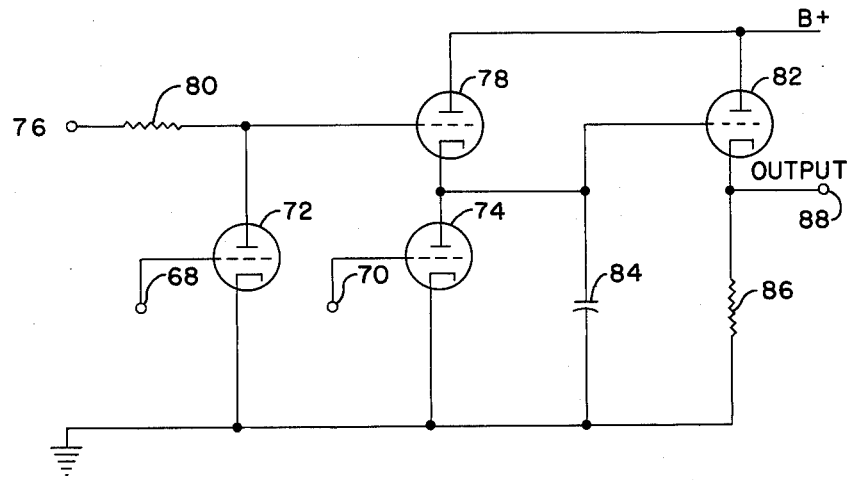

The output of sawtooth generator 35 is electrically connected to sample-and-hold circuits 46, 48, 50, 52 and 54. Each of these sample-and-hold circuits are identical to the others. A suitable sample-and-hold circuit is illustrated in FIG. 4. As can be seen from FIG. 4, each voltage sampling circuit employs four triodes, two resistors, and a capacitor. Two of these triodes, triodes 72 and 74, could readily be replaced by diodes and appropriate controlled circuitry. Transistors might also be employed in place of electron tubes. The sampling action is activated by the simultaneous application of the positive and the negative gate pulses from the multi-vibrator connected to the circuit. The triggering impulses are fed to positive gate terminal 70 and negative gate terminal 68 in the sampling circuit.

The input signal sampled by the sampling circuit shown is fed to the sample-and-hold circuit through terminal 76. Prior to the arrival of the input signal, triodes 74 and 78 are held cut off, triode 74 by the positive gate signal applied at terminal 70 and triode 78 by the drop across resistor 80 caused by current flow through triode 72. The triode 82 provides a low impedance replica of the voltage on storage condenser 84. When the input signal of the sample arrives at the sampling circuit, triode 72 is cut off, allowing the voltage on the grid of triode 78 to rise to the level of the input signal. Simultaneously triode 74 is turned on providing a cathode resistor for triode 78. Storage capacitor 84 is therefore charged to the new signal level. Immediately after the sample is stored on capacitor 84, triode 72 is turned on and triode 74 is cut off. This leaves capacitor 84 free, holding the grid of triode 82 at a signal level. Triode 82 with cathode resistor 86 provides a low impedance output source at terminal 88 for the storage capacitor signal. It will be understood that the sampling circuit thus described is merely representative of circuitry useful for practicing the method of this invention and that the method is not limited to use in any particular sample-and-hold circuit.

Attention is directed now back to counter 34 in FIG. 3 which is electrically connected to the output of zero crossing picker 31. The counter as illustrated has five outputs, $a$ through $e$ inclusive, which are sequentially energized by the pulses from zero crossing picker 31. That is, output $a$ is energized by the first pulse received, output $b$ is energized by the second pulse received, etc. Only one output of counter 14 is energized at any one time but each individual output is energized by every fifth pulse from zero crossing picker 31. Suitable counters are commercially available. One such counter is sold by Baird-Atomic, Inc., 33 University Road, Cambridge 38, Massachusetts, and designated GS-10C. It is to be understood, of course, that counter 34 may have various numbers of outputs. The number of outputs will depend primarily upon the frequency of the signal being analyzed. The number of sample-and-hold circuits 46 etc. will be the same as the number of outputs of counter 34 and the same number delay multi-vibrators 36 etc. and multi-vibrators 46A, etc.

Outputs $a$ through $e$ inclusive and counter 34 are electrically connected individually to a one-shot multi-vibrator 66A through $e$ respectively. Elements 66A through $e$ inclusive are identical one-shot multi-vibrators with each multi-vibrator having two outputs which are triggered by receiving the pulse from its respective output of counter 34. Each multi-vibrator has two outputs whose output signals are identical and simultaneous pulses of equal magnitude but of opposite polarity. The negative signal from multi-vibrator 66$a$ is fed through contact 68 to triode 72 (FIG. 4). The positive pulse from multi-vibrator 66$a$ is fed to contact 70 which connects to the grid of grid triode 74 (FIG. 4). This connection or circuitry is, of course, repeated for the other outputs $b$, $c$, $d$ and $e$ of counter 14 to sample-and-hold circuits 48, 50, 52 and 54 respectively.

Outputs $a$ through $e$ respectively of counter 34 are also connected individually to delay or monostable multi-vibrators 36, 38, 40, 42 and 44 respectively. Multi-vibrators 36, 38, 40, 42, and 44 may be similar to multi-vibrators 66A through 66$e$ that have pulses of greater duration. Monostable multi-vibrators 36, 38, 40, 42 and 44 are of a character that upon receiving an input pulse from its corresponding output of counter 34, each such multi-vibrator generates a positive and a negative pulse at the two outputs of the multi-vibrator. These two pulses are equal in time duration and occur simultaneously. The pulses generated by multi-vibrator 36, 38, 40, 42 and 44 all have the same duration but, of course, do not occur simultaneously. The duration of the pulses is determined by the longest half-cycle breadth to be measured. Duration should preferably be appproximately five percent longer than the longest half-cycle breadth. Stated differently, the half-cycle breadth of the lowest frequency divided by the number of counter outputs determines rather closely the half-cycle breadth of the highest frequency that that device can analyze. A device for processing a signal having a specific specified frequency count then can be made by properly selecting the number of outputs of counter 34 and then having the right number of corresponding gates 56, sample-and-hold circuits 46, delay multi-vibrators 36, and one-shot multi-vibrators 66A. Circuitry is provided as indicated in the drawings such that the negative output of multi-vibrator 36 is added to the positive output of multi-vibrator 38 at junction means $f$, the negative output of multi-vibrator 38 is added to the positive output of multi-vibrator 20 at junction means $g$, the negative output of multi-vibrator 40 is added to the positive output of multi-vibrator 42 at junction means $h$, the negative output of multi-vibrator 42 is added to the positive output of multi-vibrator 44 at junction means $i$, and the negative output of multi-vibrator 44 is added to the positive output of multi-vibrator 36 at junction means $j$. Suitable delayed multi-vibrators are known in the art, one such multi-vibrator is described in Waveforms supra, pages 166–171.

Junction means $f$ is electrically connected to gate 58, junction means $g$ to gate 60, junction means $h$ to gate 62, junction means $i$ to gate 64, and junction means $j$ to gate 56. The output of sample-and-hold circuit 46 is fed to gate 56, the output of sample-and-hold circuit 48 to gate 58, the output of sample-and-hold circuit 52 to gate 62, and the output of sample-and-hold circuit 54 to gate 64. The gating device has two inputs for receiving input signals and is of a charatcer to pass the input signal when the sum of such signals reaches a predetermined level. A suitable gating circuit is described in Waveforms supra, Paragraph 9.5, pages 331–333. It will be noted hereinafter that at any one time only one of the gates will be passing a signal but there will always be one of the gates open. In other words, a continuous signal will be added together at junction 89. The output signals from the gates are added at junction 89 and are fed to a display mechanism or storage 91 or can be fed directly to galvanometer 14 of FIG. 1. It is thus seen that when a sinusoidal seismic signal is fed to zero crossing picker 31, that the output at junction 89 is a series of voltage levels in which the duration of each level and its amplitude is a function of the distance between its corresponding zero crossings of the seismic signal.

To summarize the operation of the device in FIG. 3, it is seen that the measure of the time between two successive zeros of a seismic signal is made and saved. A linearly rising voltage ramp rising from zero is generated between each successive zero crossing. The maximum value of this voltage ramp is sampled and held. The voltage thus held is passed through the gating means for a period of time equal to the time between zero crossings which has been measured and saved. This process is repeated between each zero crossing. The voltage thus passed to the gates is a series of substantially rectangular wave forms which has a series of voltage levels with each level having an amplitude and duration proportional to the distance between the corresponding zero crossing which it represents. It is also noted that other points may be used in place of the zero crossing such as apply to positive zero crossings, negative zero crossing, the peaks or the valleys.

It will be understood that the apparatus and the system contained in the above description are merely representative and not limiting, and that various modifications may be made therein without departing from the scope of the invention.

What is claimed is:

1. A system for analyzing a seismic signal which has variable time intervals between zero crossings which comprises: breadth detector means whose output signal is a series of voltage levels in which the amplitude and duration of each level is proportional to the corresponding time between adjacent zero crossings; a galvanometer electrically connected to the output of said breadth detector means, said galvanometer having a mirror whose rotational position is responsive to the input signal fed to the galvanometer; a light source means of a character to direct a beam of light onto the mirror of said galvanometer; a plurality of closely-spaced adjacent light-sensitive photoelectric cells arranged to receive reflections of the light beam of said light source from said mirror; an electronic integrator electrically connected to the output of each of the plurality of photoelectric cells; multiplying means electrically connected to the output of each said integrators; and means to display as a frequency spectrum the output of said multiplying means.

2. An apparatus for analyzing a seismic signal which has variable time intervals between detectable significant points which comprises: a breadth detector means whose output signal is a series of voltage levels, the amplitude and duration of each level being a function of its corresponding time intervals between two adjacent significant points; a plurality of channels, there being a channel for each of selected intervals of voltage levels of said output signal; separating means electrically connected to the output of said breadth detector means and of a character to energize said channels responsive to associated selected intervals of voltage levels of said output signal; an integrator for each channel from said separating means electrically connected to said separating means so as to separately receive a signal from each energized channel; multiplying means for and connected to each said integrator; and means to display the output signal from each said multiplying means.

3. A system for analyzing a seismic signal which has variable time intervals between detectable significant points which comprises: signal generating means whose output signal is a series of voltage levels in which the amplitude of each level is proportional to the corresponding time between adjacent significant points; a plurality of channels, separating means electrically connected to the output of said signal means, said separating means including means to energize selectively said channels associated with selected voltage levels; integrators electrically connected to each energized channel; and means to display as a frequency spectrum the output of said integrators.

4. A system for analyzing a seismic signal which has variable time intervals between detectable significant points which comprises: signal generating means whose output signal is a series of voltage levels in which the amplitude of each level is proportional to the corresponding time interval between adjacent significant points; a plurality of electric transducers, each transducer being provided for a selected voltage level; means to energize each electrical transducer during the period in which the output from said signal generating means has a level within an amplitude level range assigned to such transducer; an electronic integrator electrically connected to the otuput of each of the electrical transducers; multiplying means electrically connected to the output of each said integrator; and means to display as the frequency spectrum the output of said multiplying means.

5. An apparatus for analyzing a seismic signal which comprises seismic signal generating means; separating means electrically connected to the seismic signal generating means and of a character to selectively energize channels in which each channel represents and is responsive to selected intervals of voltage levels of said signal; an integrator for each channel and electrically connected to said separating means so as to separately receive a signal from each energized channel; multiplying means for and connected to each said integrator; and means to display the output signal from each said multiplying means so as to obtain a spectrum of the output of said multiplying means.

References Cited by the Examiner

UNITED STATES PATENTS

| | | | |
|---|---|---|---|
| 2,535,043 | 12/50 | Cook | 343—100 |
| 2,817,815 | 12/57 | Evans | 343—100 |
| 2,967,274 | 1/61 | Hurvitz | 340—15.5 XR |
| 2,991,446 | 7/61 | Loper | 340—15.5 |
| 3,063,014 | 11/62 | Shanks | 340—15.5 X |
| 3,070,776 | 12/62 | Burns | 340—15.5 |
| 3,072,906 | 1/63 | Williams | 340—15.5 X |
| 3,072,907 | 1/63 | Boucher | 340—15.5 X |
| 3,142,815 | 7/64 | Picou | 340—15.5 |

SAMUEL FEINBERG, *Primary Examiner.*

CHESTER L. JUSTUS, *Examiner.*